UNITED STATES PATENT OFFICE.

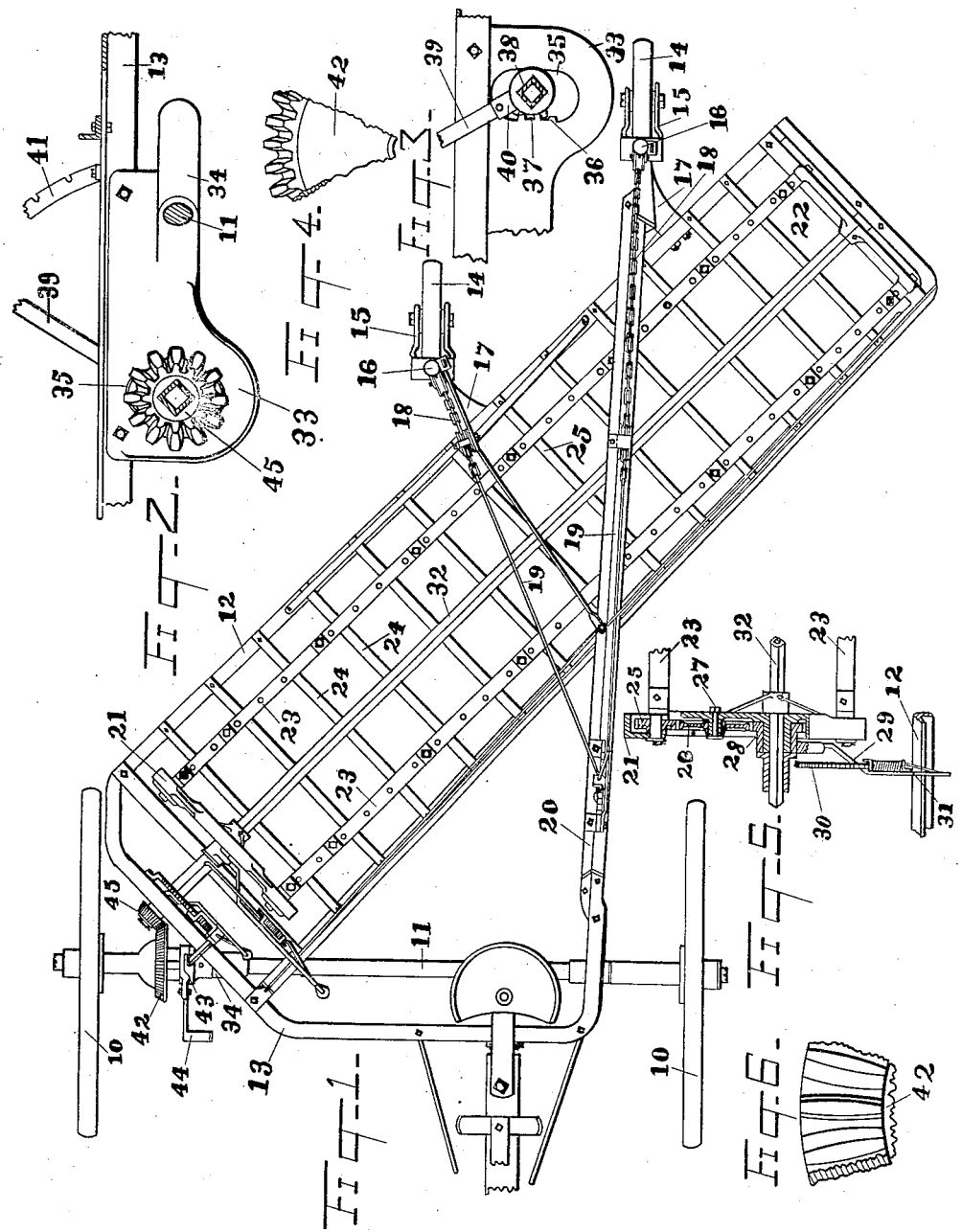

LEON R. CLAUSEN, OF MOLINE, ILLINOIS, ASSIGNOR TO THE DAIN MANUFACTURING COMPANY OF IOWA, OF OTTUMWA, IOWA, A CORPORATION OF IOWA.

SIDE-DELIVERY ROTARY RAKE.

1,371,410.

Specification of Letters Patent.   Patented Mar. 15, 1921.

Application filed July 10, 1919.  Serial No. 309,905.

*To all whom it may concern:*

Be it known that I, LEON R. CLAUSEN, a citizen of the United States, and a resident of Moline, in the county of Rock Island and State of Illinois, have invented certain new and useful Improvements in Side-Delivery Rotary Rakes, of which the following is a specification, reference being had to the accompanying drawings.

This invention relates to side-delivery rotary rakes of the type wherein the rotary reel is arranged at an angle to the line of draft of the wheeled supporting frame, to the axle of which the frame of the rotary reel is pivotally secured, the several series of rake-teeth with which the reel is equipped being maintained at the same angle so as to be presented properly to the hay that is to be raked. Such teeth are held in the desired uniform working position by the employment of suitable mechanism carried by the forward or inner reel-head and comprising, generally, a set of gears in connection with each tooth bar and a single other gear placed centrally with respect to the several sets and in mesh with the inner one of each of said sets of gears.

It has been common to provide at the rear of the reel-frame and near its outer end one or more caster-wheels between which and the reel-frame a vertical relative adjustment could be effected,—the said frame during such adjustment rocking about the axle of the machine as an axis. In making such an adjustment, it is evident that the outer or rear end of the reel-frame and also the reel that is supported in such frame will move through a greater arc than the inner or front end of such frame and reel, and it is sometimes desirable that such inner or forward end of the reel be given an adjustment additional to that which is secured by the character of adjustment above referred to, but it is also desirable that this additional adjustment be confined to the reel itself as distinguished from the adjustment of the reel and its frame together. On account of simplicity of construction it is desirable to drive the reel-shaft directly from the main axle by means of two intermeshing bevel gears secured, respectively, to the shaft and axle as fully shown and described in the Letters Patent to Joseph Dain, No. 886,681, dated May 5, 1908, but it is also desirable that provision be made for simultaneously shifting the angle of the various tooth bars by slightly rotating the gearing carried by the inner reel-head, as above referred to—which latter operation would prevent the independent vertical adjustment of the inner end of the reel if the adjusting lever were rigidly connected with the frame. I have, therefore, made use, in connection with the present invention, of my invention set forth in Patent No. 1,283,674, granted November 5, 1918, upon my application, which, while primarily designed for allowing for a lateral adjustment of the reel, will also allow of a vertical adjustment of the reel with respect to its frame. It is the object of my present invention to furnish a construction by which the inner end of the reel may be vertically adjusted and the bevel gear on the inner end of the reel-shaft maintained at all times in proper connection with the main driving gear on the axle, and also allow the shifting mechanism connected with the gears on the inner reel-head to be connected with the reel-frame. I accomplish this object by the construction and arrangement of parts shown in the drawing and hereinafter fully described. That which I believe to be new and desire to cover by this application is set forth in the claims.

In the drawings,—

Figure 1 is a plan view of a side-delivery rotary rake embodying my improvements;

Fig. 2 is a detail, being a view in elevation of a portion of the inner end of the reel-frame, the axle of the wheeled support being shown in section, as is also the reel-shaft, upon which shaft is shown the bevel gear that is driven from the gear on the rotating axle.

Fig. 3 is a detail, being a view from the opposite side of the portion of the frame that is shown in Fig. 2 and showing the means employed for effecting a raising and lowering of the reel-shaft with respect to the reel-supporting frame;

Fig. 4 is a detail, being a side view of a portion of the driven bevel gear secured to the reel-shaft;

Fig. 5 is a detail, being a central section through the inner head of the rotary reel, showing a portion of the gearing mounted on said head, the view also showing the lever and pivoted sector construction through which the gears on the reel-head may be adjusted to change the angle of the rake-teeth; and Fig. 6 is a partial face view of the gear on the axle that meshes with the pinion on the reel-shaft.

Referring to the several figures of the drawings,—10—10 indicate a pair of carrying wheels mounted upon an axle 11. Such axle and wheels are ordinarily connected together by any suitable means so that the axle will be caused to rotate upon the forward movement of the machine, but not rotate when the machine is backed. Such connecting means between an axle and a wheel are common and well understood, and, therefore, are not here illustrated. 12 indicates an ordinary diagonally-disposed reel-frame which is connected with the axle 11 so as to rock freely thereon when the frame is adjusted relative to its usual rear ground-engaging support or supports. In the construction shown the connecting of the frame 12 is through the medium of a bent supplemental frame member 13 that is rigidly connected with and forms an extension of the main frame 12. I have shown the machine provided with two ground-engaging supports in the form of caster-wheels, each of which is indicated by 14. Each caster-wheel is mounted in a yoke 15 from which rises a standard 16 that has a sliding connection in bearings carried by an arm 17 that is secured to and projects rearwardly from the rear bar of the frame 12. From each of the standards 16 extends a connection comprising a chain member 18 and a link member 19, the forward ends of the two link members being connected to a common adjusting lever that is mounted on the usual long truss bar 20 that extends from the wheeled support back and over the reel-frame. The chain members of these said connections pass under suitable pulleys journaled on the reel-frame so that when a pull is exerted on the connections 18—19 by means of their common lever on the truss bar the reel frame will be adjusted vertically relative to the supporting caster-wheels. The details of this frame-adjusting mechanism are fully shown and described in Letters Patent No. 1,313,880, dated August 27, 1919, granted upon my application.

The reel that is rotatably mounted in the frame 12 comprises two heads connected together by a plurality of bars, to which bars the rake-teeth are connected in the usual manner. The inner or forward one of these reel-heads is indicated by 21 and the outer or rear reel-head is indicated by 22. Two of the tooth bars are shown in Fig. 1 and it is intended that three of such bars will be employed, as fully set forth and described in said Dain patent and my said Patent No. 1,283,674. The tooth bars here shown are indicated by the numeral 23. 24 indicates curved guards that are secured at regular intervals to the front and rear members of the reel-frame and act to free the rake teeth from any hay that might tend to be carried around with such teeth.

The inner or forward reel-head 21 has rotatably secured on its outer face a plurality of sets of gears, the number of sets corresponding in number to the number of the tooth bars 23, and in the outer gear of each set the forward end of one of the tooth bars will be secured as usual. In Fig. 5 is shown in section one of the three sets of gears mentioned and also the central gear that is in mesh with the inner one of each of the several sets. The outer gear here shown is indicated by 25 and the gear that is in mesh therewith is indicated by 26, such gear 26 being journaled upon a pin 27 made fast to the reel-head. The smaller central gear referred to is indicated by 28, and while such gear 28 is normally held fixed against rotation it may be rocked on the cylindrical hub over which it is shown as fitting, such rocking being to effect a change in the position of the several tooth bars so as to incline to the desired extent the rake-teeth carried by such bars. In said Fig. 5 there is shown a lever and a movable sector construction, by the use of which this rocking of the central gear may be accomplished. The lever is indicated by 29 and is rigidly fixed at its inner end to a small central gear 28, its outer end portion extending alongside of the sector referred to so as to be locked thereto at any desired point by means of an ordinary spring latch (not shown) carried by the lever. The notched sector referred to is indicated by 30. It is pivotally attached to the front bar of the reel-frame 12 at 31 and its under edge rests loosely upon a pin or bracket projecting from the lever. This lever and pivoted sector construction is set forth very fully in my said Letters Patent No. 1,283,674.

32 indicates the usual central shaft of the reel upon which the reel-heads 21 and 22 are suitably secured so as to turn therewith. The shaft is preferably angular in cross-section as shown. The outer end bearing for this shaft 32 is to be large enough so as to allow the shaft to have a limited rising and falling movement when power is applied to the inner end thereof, as hereinafter described, in order that the forward or inner end of the reel may be adjusted independently of any adjustment given to its supporting frame,—that is independently of the adjustment effected through a movement of the connections 18—19 that lead to the ground-engaging supports. In order to effect this independent vertical adjustment of the forward or inner end of the reel-shaft such inner end is supported in an adjustable member capable of being held in different adjusted positions in a vertically-slotted bracket 33 depending from the framework, which bracket, in the construction shown, is formed integral with a sleeve member 34 through which passes the axle 11. 35 indicates a vertical slot in the bracket, in the forward edge of which is formed, as shown, a series of teeth 36 that constitute a rack with which mesh the teeth of a pinion 37 that is rotatably mounted on the cylindrical surface of a sleeve 38 fitted over the reel-shaft. Inasmuch as the rack 36 is comparatively short the entire periphery of the pinion is not provided with teeth, and hence such pinion may properly be termed a mutilated pinion. The untoothed portion of the periphery of this pinion bears against the opposite edge of the slot and thus insures the teeth of the pinion being held in engagement with the rack. The raising and lowering of the inner or forward end of the reel-shaft is accomplished by means of an adjusting lever 39, which, as best shown in Fig. 3, is bolted to an arm 40 that is formed integral with an annular flange on the outer end of the mutilated pinion, such flange bearing against the inner face of the bracket 33 at each side of the longitudinal slot.

As this lever 39 is turned it is evident that through the meshing of the teeth of the mutilated pinion 37 with the rack 36 the pinion must be vertically moved according to the direction in which the lever is moved, and, of course, will carry with it the reel-shaft that projects through and has a bearing in the short sleeve on which the pinion is rotatably mounted. When the desired adjustment has been attained the adjusting lever 39 can be locked to a notched segment 41, the engagement of the lever with the segment being by means of an ordinary spring latch that will be carried by the lever.

The means for rotating the reel comprises, in the construction shown, a large bevel gear 42 carried by the axle 11 and adapted to be connected with said axle so as to rotate therewith at will by any suitable clutch mechanism—a clutch for this purpose being indicated generally in Fig. 1 by the numeral 43, the part of the clutch movable along the axle having attached to it a handle 44. Constituting a part of the reel-driving means is a bevel pinion 45 fast on the projecting inner or forward end of the reel-shaft and in mesh with the bevel gear 42.

The bevel pinion 45 differs in construction from the ordinary bevel pinion, in that each of its teeth has its side faces beveled from the center of the teeth toward the ends instead of having each face beveled in a straight line from end to end of the tooth. This double beveling of each of the side faces of the teeth permits the rolling of the pinion over the similar teeth of the bevel gear 42 during the vertical adjustment of the pinion and its attached shaft without causing any binding between the gear and pinion and without tending to separate them. This is due to the fact that by reason of the double bevel given to the teeth as described such teeth will smoothly and properly be in mesh with the gear only in connection with their bevels on the outer half of the pinion and gear when such pinion is in one adjusted position and with the beveled portion of the teeth toward the other side of the pinion and gear when such pinion is differently adjusted. Of course, this proper meshing of the pinion with the gear, first in connection with the bevels at one side of the pinion and gear, and again, when in another adjusted position, with the bevels on the other side of the pinion and gear, is made possible only by reason of the comparatively short range of vertical adjustment of the pinion.

The smooth running engagement of the pinion and gear attained by forming the teeth in the manner described is also aided by the coöperation afforded by the pivoted sector construction with which the lever for rotating the gears in the inner reel-head is connected, for, as will be appreciated, if such adjusting lever for the gear and the reel-head was locked in the usual manner to a rigidly connected sector it would seriously interfere, if not prevent, the vertical adjustment of the reel and, at all events, would make it extremely difficult for the pinion 45 to pass smoothly from engagement with the gear 42 by means of the beveled sides at one end of the pinion teeth to the beveled sides at the other end of such teeth.

What I claim as my invention and desire to secure by Letters Patent, is—

1. In a side-delivery rotary rake, the combination of a wheeled support comprising a rotating axle, a diagonally extending frame having its forward portion pivotally connected with said wheeled support, a rotatable reel carried by said frame and comprising a rotating shaft having one of its ends loosely journaled in said frame so as to permit a slight vertical adjustment of the other end of the shaft, a toothed member in which such other end of said shaft is supported, a fixed rack with which said toothed member engages, means for turning said toothed member along the rack to effect a vertical adjustment thereof and the reel-shaft carried thereby, an intermeshing gear and pinion carried by the axle and reel-shaft, respectively, said gear and pinion having their teeth oppositely beveled from their centers.

2. In a side-delivery rotary rake, the combination of a wheeled support comprising a rotating axle, a diagonally extending frame having its forward portion pivotally connected with said wheeled support, a rotatable reel carried by said frame and comprising a rotating shaft having one of its ends loosely journaled in said frame so as to permit a slight vertical adjustment of the other end of the shaft, a toothed member in which such other end of said shaft is supported, a slotted bracket secured to and depending from the reel-frame and having a rack on one of its edges with which said toothed member engages, means for turning said toothed member along the rack to effect a vertical adjustment thereof and the reel-shaft carried thereby, an intermeshing gear and pinion carried by the axle and reel-shaft, respectively, said gear and pinion having their teeth oppositely beveled from their centers.

3. In a side-delivery rotary rake, the combination of a wheeled support comprising a rotating axle, a diagonally-extending frame connected with and in rear of said wheeled support, a rotatable reel journaled in said frame comprising two heads, a central shaft and a plurality of tooth-carrying bars extending between said heads, said shaft having one of its ends loosely journaled in said frame so as to permit a slight vertical adjustment of the other end of the shaft, gearing carried by one of said heads and connected with the tooth-carrying bars for maintaining the rake-teeth in position, an adjusting lever connected with said gearing for turning the same to change the position of the rake-teeth, a movable device mounted on the frame for interlocking with the lever, means for adjusting the reel with respect to its supporting frame, and means for driving said reel in any of its adjusted positions comprising an intermeshing gear and pinion carried by the said axle and reel-shaft, respectively, said gear and pinion having their teeth oppositely beveled from their centers.

4. In a side-delivery rotary rake, the combination of a wheeled-support comprising a rotating axle, a diagonally-extending frame having its forward portion pivotally connected with said wheeled-support, a rotatable reel carried by said frame and comprising a rotatable shaft loosely journaled at one end in the frame so as to permit a slight vertical adjustment at the other end, means for vertically adjusting such other end of said shaft, and intermeshing bevel gear members carried by the axle and shaft, respectively, the sides of the teeth of which are oppositely beveled from their centers to keep said gear members in mesh in any adjusted position of the shaft.

LEON R. CLAUSEN.